United States Patent
Kupratis (10) Patent No.: US 12,209,534 B1
(45) Date of Patent: Jan. 28, 2025

(54) AIRCRAFT ENGINE ENTRAINED PARTICLE SEPARATION SYSTEM AND METHOD

(71) Applicant: RTX Corporation, Farmington, CT (US)

(72) Inventor: Daniel B. Kupratis, Wallingford, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 18/400,483

(22) Filed: Dec. 29, 2023

(51) Int. Cl.
*F02C 7/05* (2006.01)
*F02C 9/18* (2006.01)

(52) U.S. Cl.
CPC . *F02C 7/05* (2013.01); *F02C 9/18* (2013.01)

(58) Field of Classification Search
CPC .. F02K 3/077; F02C 7/05; F02C 7/052; F02C 7/04; F02C 7/143; F02C 6/08
See application file for complete search history.

(56) References Cited

U.S. PATENT DOCUMENTS

| | | | |
|---|---|---|---|
| 3,589,132 A * | 6/1971 | Du Pont | F02K 3/105 60/262 |
| 4,896,510 A | 1/1990 | Foltz | |
| 5,044,153 A * | 9/1991 | Mouton | F02C 9/18 55/306 |
| 6,134,880 A * | 10/2000 | Yoshinaka | F28D 9/0018 60/806 |
| 10,724,436 B2 | 7/2020 | Mayer | |
| 11,333,173 B2 * | 5/2022 | Nichols | F04D 17/122 |
| 2013/0255224 A1* | 10/2013 | Kupratis | F02C 9/18 60/39.15 |
| 2015/0322855 A1* | 11/2015 | Kupratis | F02C 3/06 60/805 |

FOREIGN PATENT DOCUMENTS

RU 2752445 C1 7/2021

* cited by examiner

*Primary Examiner* — Thuyhang N Nguyen
(74) *Attorney, Agent, or Firm* — Getz Balich LLC (57) ABSTRACT

A gas turbine engine is provided that includes a bypass duct, fan, compressor, combustor, and turbine sections, a nozzle, a turning duct assembly, and a first bleed valve. The compressor section includes a compressor inlet and low and high pressure compressors. The turning duct assembly has first and second axial segments and first and second return segments. The first axial segment is in fluid communication with the low pressure compressor and the first return segment. The second axial segment is in fluid communication with the first return segment and the second return segment. The high pressure compressor is in fluid communication with the second return segment. The first and second axial segments and the first and second return segments are configured to provide an airflow passage between the low and high pressure compressors. The first bleed valve is in fluid communication with the first return segment.

18 Claims, 5 Drawing Sheets

AIRCRAFT ENGINE ENTRAINED PARTICLE SEPARATION SYSTEM AND METHOD

BACKGROUND OF THE INVENTION

1. Technical Field

The present disclosure relates to aircraft engines in general and to aircraft including mechanisms for removing entrained particles from an engine in particular.

2. Background Information

Particles of various materials such as sand and dust and chemicals that enter a turbine engine can be harmful, for example potentially causing component surface erosion and/or corrosion, clogging of cooling holes and passages, to name a few. What is needed is an improved system for removing entrained particles from air passing within an aircraft turbine engine.

SUMMARY

According to an aspect of the present disclosure, a gas turbine engine having an axially extending centerline is provided. The engine includes a fan section, a bypass duct, a compressor section, a combustor section, a turbine section, a nozzle, a turning duct assembly, and a first bleed valve. The compressor section includes a compressor inlet, a low pressure compressor (LPC), and a high pressure compressor (HPC). The turning duct assembly has a first axial segment, a second axial segment, a first return segment, and a second return segment. The first axial segment has an inlet end (FAS inlet end) in fluid communication with the LPC and an exit end (FAS exit end) in fluid communication with an inlet end of the first return segment (FRS inlet). The second axial segment has an inlet end (SAS inlet end) in fluid communication with an exit end of the first return segment (FRS exit end), and an exit end (SAS exit end) in fluid communication with an inlet end of the second return segment (SRS inlet end). An inlet of the HPC is in fluid communication with an exit end of the second return segment (SRS exit end). The first and second axial segments extend substantially axially. The first return segment provides an arcuate passage from the FAS exit end to the SAS inlet end. The second return segment provides an arcuate passage from the SAS exit end to an inlet of the HPC. The first and second axial segments and the first and second return segments are configured to provide an airflow passage from the LPC to the HPC. The first bleed valve is in fluid communication with the first return segment.

In any of the aspects or embodiments described above and herein, the gas turbine engine may include a power turbine having an inlet in fluid communication with the first return segment.

In any of the aspects or embodiments described above and herein, the gas turbine engine may include a plurality of struts, each having an internal passage in fluid communication with the first return segment and the power turbine inlet.

In any of the aspects or embodiments described above and herein, the first bleed valve may be in fluid communication with an outer wall of the first return segment at a first position of the outer wall, and the power turbine may be in fluid communication with the outer wall of the first return segment at a second position of the outer wall, and the second position is downstream of the first position.

In any of the aspects or embodiments described above and herein, the turbine section may include a high pressure turbine and a low pressure turbine, and the engine may include a low pressure shaft connecting the low pressure turbine to the LPC and a power turbine may be in driving communication with the low pressure shaft.

In any of the aspects or embodiments described above and herein, the power turbine may be a radial inlet turbine.

In any of the aspects or embodiments described above and herein, the gas turbine engine may include a second bleed valve in fluid communication with the bypass duct, and the first bleed valve may be in fluid communication with the nozzle.

In any of the aspects or embodiments described above and herein, the first bleed valve may be actuable between a closed configuration and an open configuration and the second bleed valve may be actuable between a closed configuration and an open configuration.

In any of the aspects or embodiments described above and herein, the gas turbine engine may include an annular flow splitter having a splitter inlet and a splitter outlet, wherein the splitter inlet is disposed to receive a portion of a core gas exiting the turbine section, and the splitter outlet is disposed radially outward of the annular exhaust flow splitter.

In any of the aspects or embodiments described above and herein, the gas turbine engine may include a first set of flow vanes disposed within the first return segment, and the first set of flow vanes may be configured to direct an airflow within the first return segment.

In any of the aspects or embodiments described above and herein, the gas turbine engine may include a second set of flow vanes disposed within the second return segment, and the second set of flow vanes may be configured to direct an airflow within the second return segment.

In any of the aspects or embodiments described above and herein, the engine may include a core gas path that extends through the LPC, the HPC, the combustor section, and the turbine section, and the turning duct assembly may define a first portion of the core gas path between the LPC and the HPC.

In any of the aspects or embodiments described above and herein, a portion of the first axial segment, a portion of the second axial segment, and the first return segment may be disposed radially outside of the HPC, the combustor section, and the turbine section.

In any of the aspects or embodiments described above and herein, the first axial segment may be configured to direct an airflow in a first axial direction, and the second axial segment may be configured to direct the airflow in a second axial direction, wherein the first axial direction is substantially opposite the second axial direction.

In any of the aspects or embodiments described above and herein, the first return segment may be configured to turn the airflow about one hundred and eighty degrees and the second return segment may be configured to turn the airflow about one hundred and eighty degrees.

In any of the aspects or embodiments described above and herein, the gas turbine engine may include a second bleed valve in fluid communication with the first axial segment, and the second bleed valve may be controllable to bleed a first portion of an airflow passing through the first axial segment into the bypass duct, and the first bleed valve may be in fluid communication with a nozzle such that a second portion of the airflow bled from the first axial segment is directed to the nozzle.

According to another aspect of the present disclosure, a method of removing particles entrained within an airflow passing within a core gas path of a gas turbine engine is provided. The gas turbine engine has an axially extending centerline, a compressor section having a compressor inlet, a low pressure compressor (LPC), and a high pressure compressor (HPC), a combustor section, a turbine section, and a nozzle, and the core gas path extends through the LPC, the HPC, the combustor section, and the turbine section. The method includes: passing an airflow exiting the LPC through a turning duct assembly having a first axial segment, a second axial segment, a first return segment, and a second return segment, wherein the first axial segment is configured to direct the airflow in a first axial direction, and the second axial segment is configured to direct the airflow in a second axial direction, wherein the first axial direction is substantially opposite the second axial direction, and the first return segment is configured to turn the airflow from the first axial direction to the second axial direction, and the second return segment is configured to turn the airflow from the second axial direction to the first axial direction, and wherein the first return segment has an outer wall; and selectively bleeding a first portion of the airflow off of the outer wall of the return segment using a bleed valve.

In any of the aspects or embodiments described above and herein, the first bleed valve may be in fluid communication with the nozzle.

In any of the aspects or embodiments described above and herein, the method may include bleeding a second portion of the airflow off of the outer wall of the first return segment and directing the second portion of the airflow to a power turbine in driving communication with a low pressure shaft of the gas turbine engine.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
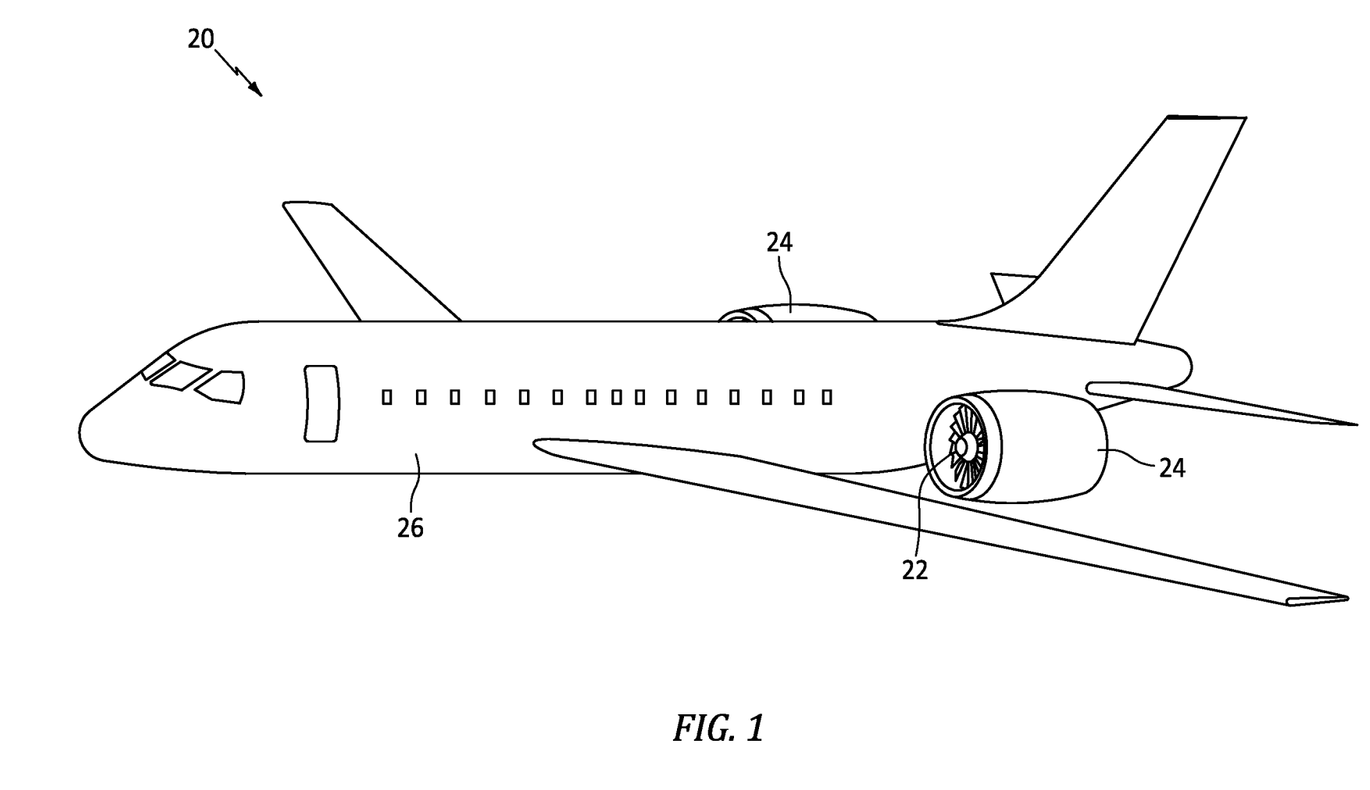
FIG. 1 is a diagrammatic view of an aircraft that includes a pair of engines, a pair of nacelles, and a fuselage.

FIG. 1 is a diagrammatic view of an aircraft 20 that includes a pair of engines 22, a pair of nacelles 24, and a fuselage 26.

Figure 2:
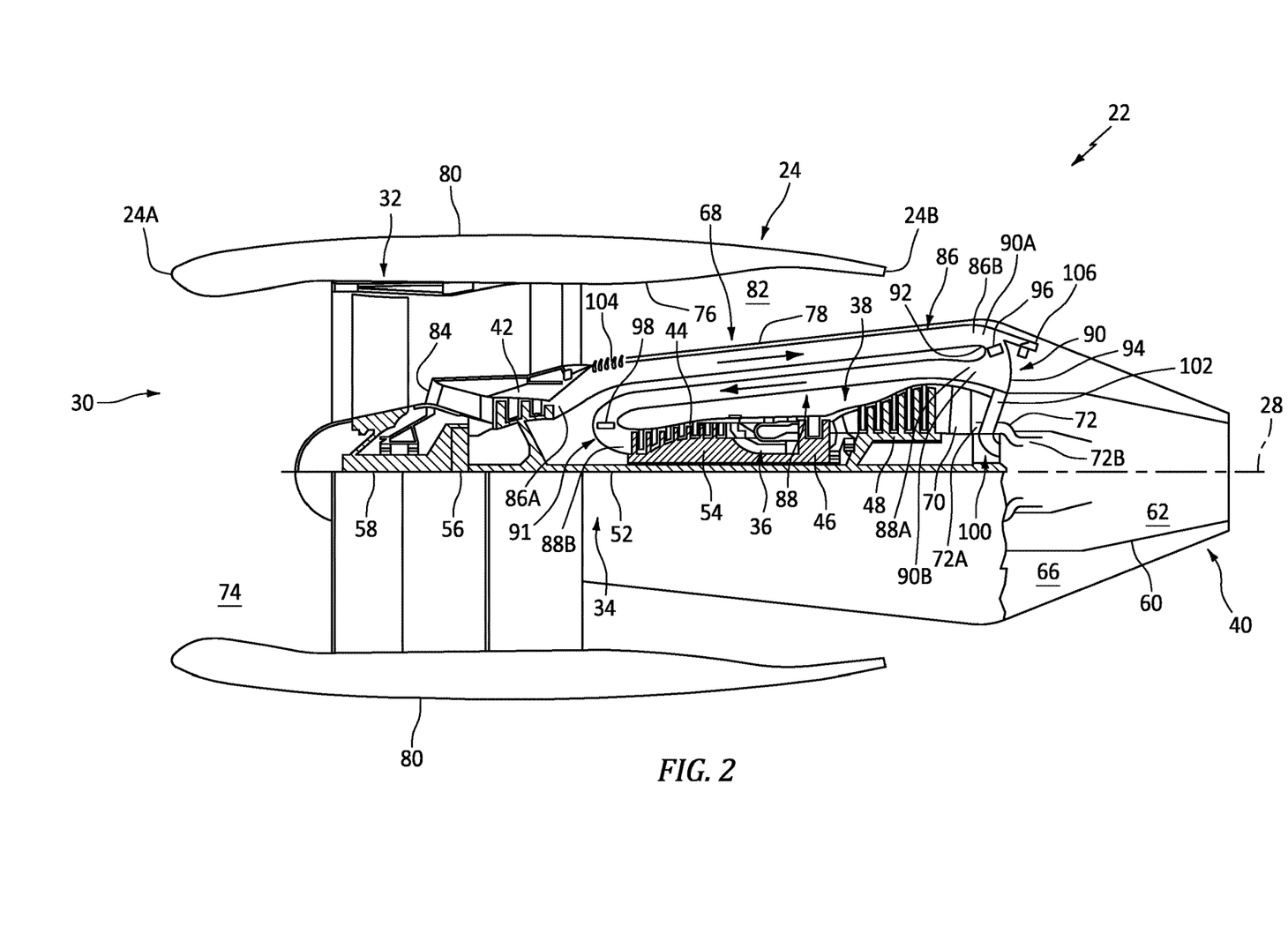
FIG. 2 is a diagrammatic partially sectioned view of a geared gas turbine engine disposed within a nacelle.
Figure 3:
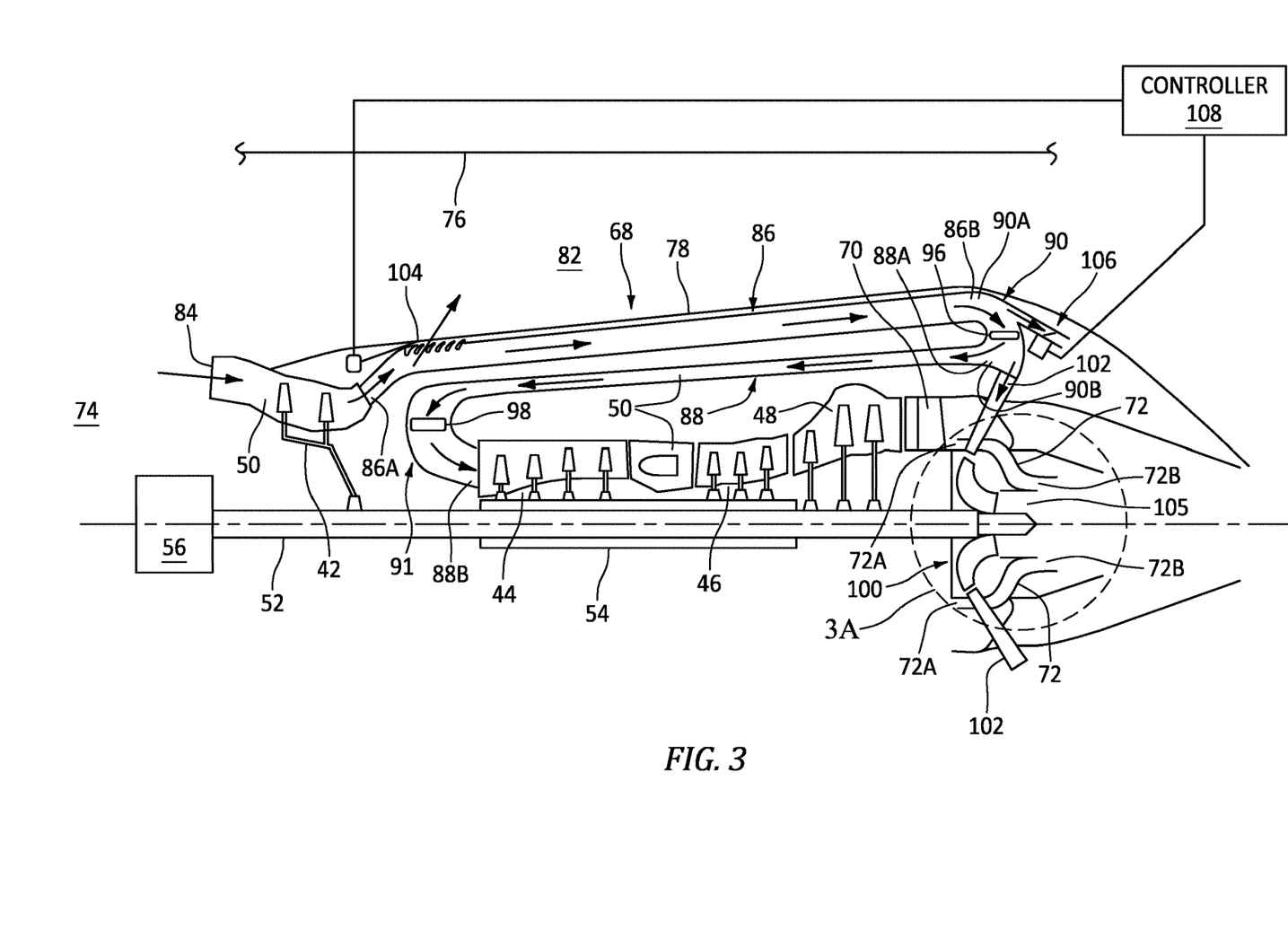
FIG. 3 is a diagrammatic partial view of a geared gas turbine engine.

FIG. 2 shows a diagrammatic partially sectioned view of a geared gas turbine engine 22 disposed within a nacelle 24. FIG. 3 shows an enlarged diagrammatic partial view of a geared gas turbine engine 22. The gas turbine engine 22 extends along an axial centerline 28 between an upstream airflow inlet 30 and a downstream airflow exhaust (e.g., nozzle 40). The gas turbine engine 22 includes a fan section 32 (see FIG. 2), a compressor section 34, a combustor section 36, a turbine section 38, and a nozzle 40. The compressor section 34 includes a low-pressure compressor (LPC 42) and a high-pressure compressor (HPC 44). The turbine section 38 includes a high-pressure turbine (HPT 46) and a low-pressure turbine (LPT 48). The engine sections are arranged sequentially along the axial centerline 28. The gas path through the compressor, combustor, and turbine sections 34, 36, 38 is referred to as the core gas path 50. The terms "forward", "leading", "aft, "trailing" are used herein to indicate the relative position of a component or surface. As air passes through the engine 22, a "leading edge" of a stator vane or rotor blade encounters the air before the "trailing edge" of the same. In a conventional axial engine 22 such as that shown in FIG. 2, the fan section 32 is "forward" of the compressor section 34 and the turbine section 38 is "aft" of the compressor section 34. The terms "inner radial" and "outer radial" refer to relative radial positions from the engine axial centerline 28. An inner radial component or path is disposed radially closer to the engine axial centerline 28 than an outer radial component or path.

The LPT 48 and the LPC 42 are connected to one another by a low pressure shaft 52. During operation of the turbine engine 22, the LPT 48 drives the LPC 42. The HPT 46 and the HPC 44 are connected to one another by a high pressure shaft 54. During operation of the turbine engine 22, the HPT 46 drives the HPC 44. The fan section 32 is connected to a geared architecture 56 (see FIG. 2), for example, through a fan shaft 58. The geared architecture 56 (e.g., that includes a reduction gear box or "RGB") may be driven by the low pressure shaft 52, and the RGB in turn drives the fan shaft 58. The nozzle 40 is diagrammatically shown as a convergent nozzle 40 having inner radial panels 60 that form an annular inner radial nozzle region 62, and outer radial panels 64 disposed radially outside of the inner radial panels that form an annular outer radial nozzle region 66. As will be described herein, the inner radial nozzle region 62 is disposed to receive core gas exiting the core gas path 50 aft of the LPT 48, and the outer radial nozzle region 66 is disposed to receive pressurized air bled off of a turning duct assembly 68 (detailed herein). The nozzle 40 shown diagrammatically in FIGS. 2 and 3 is provided to illustrate an example of a nozzle configuration, and the present disclosure is not limited thereto.

Figure 3A:
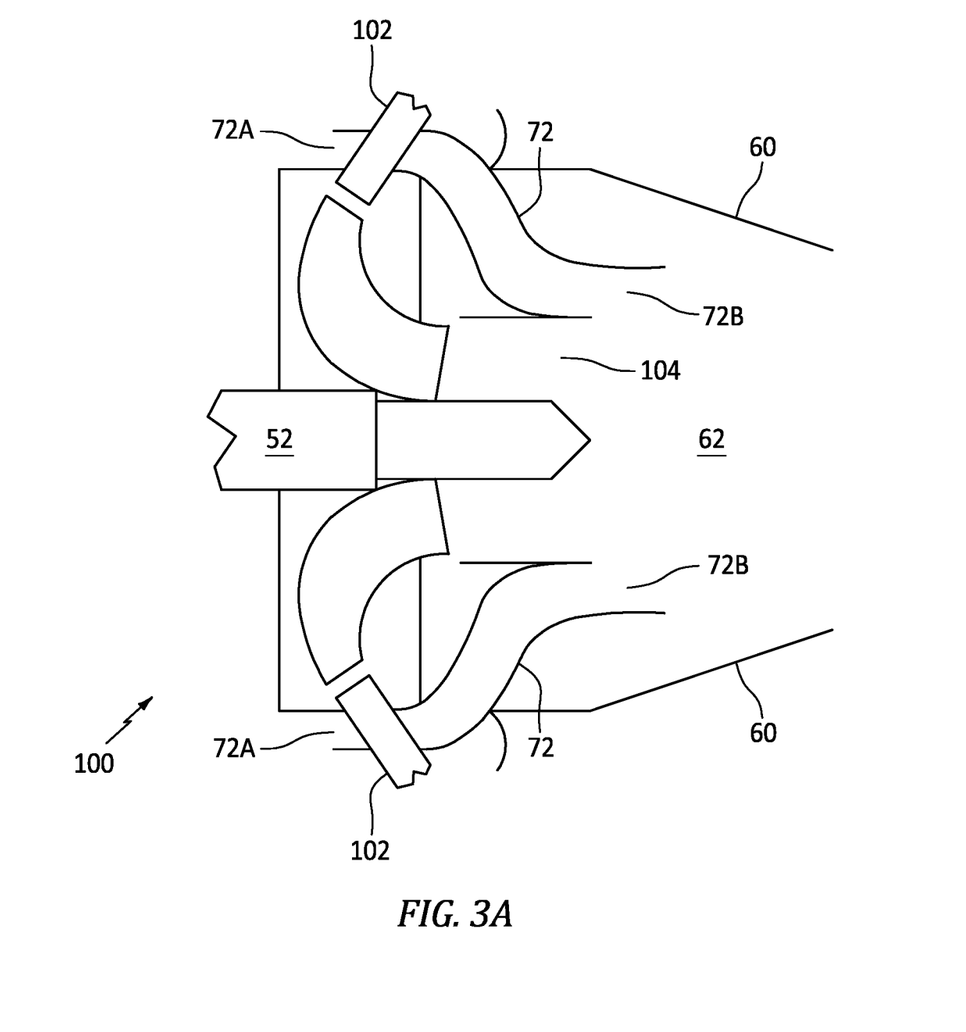
FIG. 3A is an enlarged partial view of the geared gas turbine engine shown in FIG. 3.

In the embodiment shown diagrammatically in FIGS. 3 and 3A, the turbine engine 22 includes a turbine exit guide vane (TEGV) stage 70 that includes a plurality of guide vanes disposed aft of the LPT 48 and spaced apart from one another circumferentially. As shown in FIG. 3, in some present disclosure embodiments, an annular exhaust flow splitter 72 may be included to facilitate the removal of entrained particles from the inner diameter region of the TEGV stage 70. The annular exhaust flow splitter 72 includes an inlet 72A and an outlet 72B. The splitter inlet 72A is configured to receive (e.g., "scoop") a portion of the exhaust flow exiting the LPT 48 at a first pressure (P1) and direct it to the splitter outlet 72B disposed at an inner radial position that is typically at a second pressure (P2) that is lower that the first pressure. The difference in pressure between the splitter inlet and outlet 72A, 72B (P1−P2=ΔP) provides a motive force to drive entrained particles to a position downstream of a power turbine exhaust as will be described herein.

Referring to FIG. 2, the nacelle 24 is disposed radially outside of the engine 22. The nacelle 24 may be described as extending axially between a forward end 24A and an aft end 24B. The nacelle 24 includes a nacelle inlet cavity 74, one or more panels that form an outer radial bypass duct boundary 76, one or more panels that form an inner radial bypass duct boundary 78, and one or more exterior surface panels that define an outer radial surface 80 of the nacelle 24. The nacelle inlet cavity 74 functions as a passageway into the fan section 32. Aft of the fan section 32, a bypass duct 82 (sometimes referred to as a "fan duct") is defined by the panels forming the inner radial and outer radial bypass duct boundaries 76, 78. The bypass duct 82 is disposed radially outside of a compressor inlet 84, the compressor section 34, the combustor section 36, and the turbine section 38.

The gas turbine engine 22 diagrammatically shown in FIG. 2 is an example provided to facilitate the description herein. The present disclosure is not limited to any particular gas turbine engine 22 configuration, including the two-spool engine configuration shown, and may be utilized with single spool gas turbine engines as well as three spool gas turbine engines and the like. In addition, the present disclosure is not limited to use with turbine engines that include a fan section 32 connected to a geared architecture.

Still referring to FIGS. 2 and 3, the present disclosure includes a turning duct assembly 68 having a first axial segment 86, a second axial segment 88, and a return segment 90 in communication with the first and second axial segments 86, 88. As will be detailed herein, the turning duct assembly 68 may be described as a portion of the core gas path 50 of the turbine engine 22. The first axial segment 86 (FAS), second axial segment 88 (SAS), and return segment 90 (RS) are conduits configured to contain a flow of pressurized air; i.e., air at a pressure higher than ambient. The first axial segment 86 extends between an FAS inlet end 86A and an FAS exit end 86B. The second axial segment 88 extends between an SAS inlet end 88A and an SAS exit end 88B. The return segment 90 extends between an RS inlet end 90A and an RS exit end 90B. The FAS inlet end 86A of the first axial segment 86 is configured to receive the flow of pressurized air from the core gas path 50 upstream of the turning duct assembly 68. In the embodiment diagrammatically shown in FIGS. 2 and 3, the FAS inlet end 86A of the first axial segment 86 is disposed to receive pressurized air exiting the LPC 42. The FAS exit end 86B of the first axial segment 86 is in fluid communication with the RS inlet end 90A of the return segment 90. The RS exit end 90B of the return segment 90 is in fluid communication with the SAS inlet end 88A of the second axial segment 88. The SAS exit end 88B of the second axial segment 88 is configured to direct the flow of pressurized air into the inlet of the HPC 44. The present disclosure is not limited to a configuration wherein the FAS inlet end 86A of the first axial segment 86 is disposed to receive pressurized air exiting the LPC 42. For example, in an alternative embodiment, the FAS inlet end 86A of the first axial segment 86 may be disposed to receive pressurized air upstream of the LPC 42 and the SAS exit end 88B of the second axial segment 88 may be configured to direct the flow of pressurized air into the inlet of the LPC 42. The portion of the second axial segment 88 adjacent the SAS exit end 88B may be referred to as the second return segment 91.

The return segment 90 is configured as a sharp turn that reverses (or almost reverses) the flow direction of the pressurized air within the turning duct assembly 68; e.g., turns the flow of pressurized air about one hundred and eighty degrees (180°). The return segment 90 may be described as having an inner wall 92 and outer wall 94. The inner wall 92 is the wall portion of the return segment 90 having a sharper curvature/radius relative to the outer wall 94, and the outer wall 94 is the wall portion of the return segment 90 having a greater curvature/radius relative to the inner wall 92.

In some embodiments, the turning duct assembly 68 and each of its constituent segments (i.e., first axial segment 86, second axial segment 88, first return segment 90, and second return segment 91) may be configured as annular structures that extend circumferentially around the gas turbine engine 22 core; e.g., extend circumferentially around and radially outside of the HPC 44, the combustor section 36, the LPT 48, and the HPT 46). In some embodiments, constituent segments of the turning duct assembly 68 (i.e., the first axial segment 86, second axial segment 88, and return segment 90) may be configured as a plurality of individual ducts that are circumferentially spaced apart from one another radially outside of the HPC 44, the combustor section 36, the LPT 48, and the HPT 46.

In some embodiments, the constituent segments of the turning duct assembly 68 (i.e., the first axial segment 86, second axial segment 88, first return segment 90, and second return segment 91) may be configured as a unitary structure, or may be configured as a plurality of structures that collectively form the turning duct assembly 68.

In some embodiments, the first return segment 90 may include a set of vanes (i.e., a "first set of flow vanes 96") that are configured to assist directing the pressurized air within the first return segment 90; e.g., assist in turning the pressurized air traveling through the first return segment 90 and aligning the direction of the pressurized air for entry into the second axial segment 88.

In some embodiments, the turning duct assembly 68 may include a set of vanes (i.e., a "second set of flow vanes 98") disposed within the second return segment 91. The second set of flow vanes 98 may be configured to assist directing the pressurized air within the second return segment 91; e.g., assist in directing the pressurized air traveling through the second return segment 91 and aligning the direction of the pressurized air for entry into the HPC 44.

Figure 4:
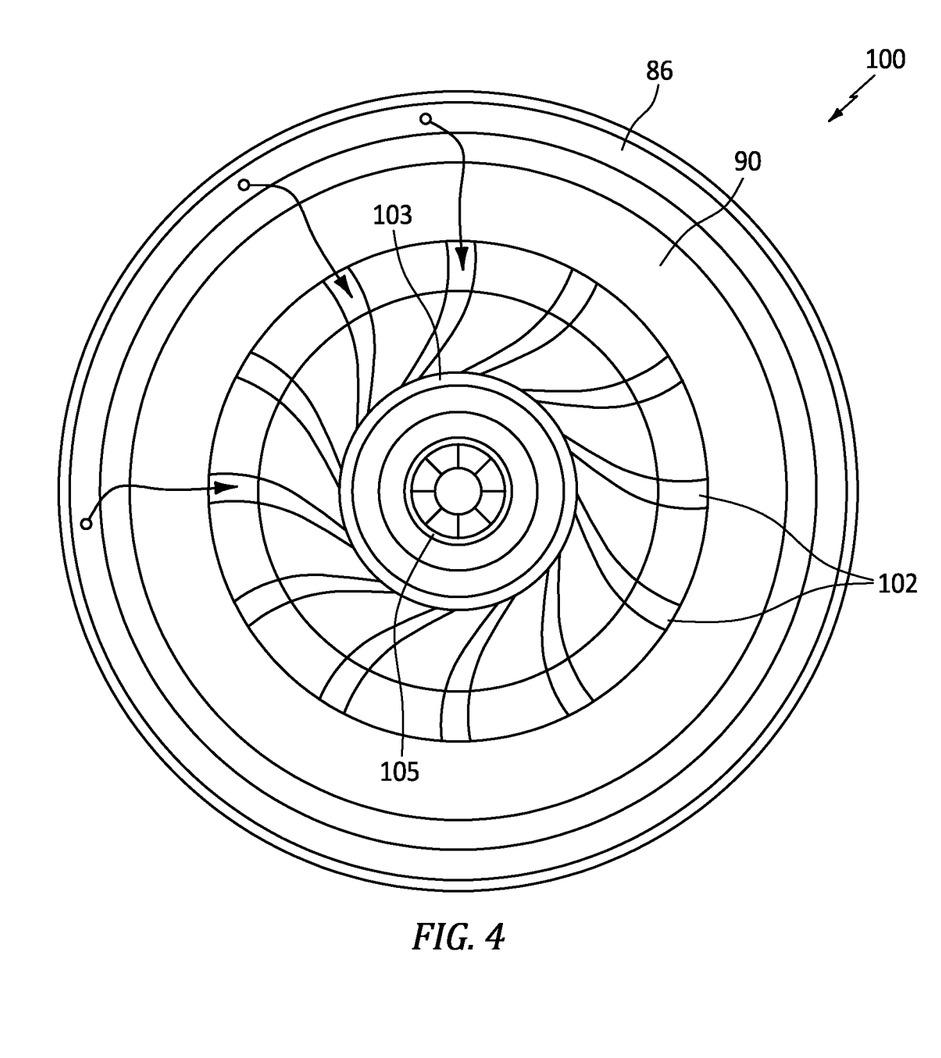
FIG. 4 is a diagrammatic view of a power turbine embodiment.

Referring to FIGS. 2-4, in some embodiments the present disclosure may include a power turbine 100 disposed aft of the LPT 48 and in drive connection to the low pressure shaft 52. A non-limiting example of an acceptable power turbine 100 configuration is a radial inflow turbine. In the embodiment shown diagrammatically in FIGS. 2-4, a plurality of passages 102 (e.g., hollow struts, or struts with an internal flow passage) provide fluid communication between the first return segment 90 of the turning duct assembly 68 and the power turbine 100 to permit pressurized air within the turning duct assembly 68 to be bled off of the turning duct assembly 68 and directed into the power turbine 100 to drive the power turbine 100. The passages 102 may extend directly from the first return segment 90 to inlet ports of the power turbine 100 (e.g., the hollow struts may be configured as discrete nozzles for pressurized air into the radial inflow turbine) or the passages 102 may extend from the first return segment 90 to an annular structure (e.g., a volute). The present disclosure is not limited to any particular passage 102 configuration between the turning duct assembly 68 and the inlet of the power turbine 100. The pressurized air entering the power turbine 100 may enter in a generally radial direction (or in a direction that includes a radial component and a circumferential component) and is turned within the power turbine 100 such that air exits an exit port 105 of the power turbine 100 in a generally axial direction. FIG. 4 diagrammatically illustrates a power turbine disposed relative to a present disclosure first return segment 90. Airflow exits the first axial segment 86/enters the first return segment 90 in an axial direction, and is directed substantially radially through the passages 102 to the turbine impeller inlet 103. The airflow subsequently exits the power turbine via the turbine impeller outlet/power turbine exit port 105 in a substantially axial direction. In those embodiments that include an annular exhaust flow splitter 72, the power turbine exit port 105 may be disposed radially inward of the annular exhaust flow splitter 72; e.g., the outer radial boundary of the power turbine exit port 105 is disposed at a radial distance that is less than the radial distance of the inner radial boundary of the annular exhaust flow splitter 72. The power turbine 100 may be in communication with the low pressure shaft 52 and power produced within the power turbine 100 may be delivered to the low pressure shaft 52; e.g., for use in driving the LPT 48 and or geared architecture 56 that, in turn, drives the fan section 32.

Some embodiments of the present disclosure may include an actuatable bleed valve (i.e., a "first actuatable bleed valve 104") in fluid communication with the first axial segment 86. The turning duct assembly 68 embodiment shown in FIG. 3 includes a first actuatable bleed valve 104 disposed in an outer radial surface of the first axial segment 86 in proximity to the FS inlet end 86A. The bleed valve 104 may be actuated to a closed configuration (zero flow), a fully open configuration (maximum flow), or to a plurality of partially open positions (less than maximum flow). The bleed valve 104 may be directly or indirectly in communication with the bypass duct 82, to permit air passing within the first axial segment 86 to exit the first axial segment 86 and traverse into the bypass duct 82.

Some embodiments of the present disclosure may include an actuatable bleed valve (i.e., a "second actuatable bleed valve 106") in fluid communication with the return segment 90. The turning duct assembly 68 embodiment shown in FIG. 3 includes a second actuatable bleed valve 106 disposed in communication with an outer wall 94 of the first return segment 90. The bleed valve inlet may be disposed in the outer wall 94 of the first return segment 90; e.g., at or before the outer radial inflection point of the first return segment 90. The bleed valve 106 may be actuated to a closed position (zero flow), a fully open position (maximum flow), or to a plurality of partially open positions (less than maximum flow). The bleed valve 106 is configured to permit air (and particles entrained therein) proximate the outer wall 94 to exit the first return segment 90.

In some embodiments, a controller 108 may be utilized to control the actuation of one or both of the first and second actuatable bleed valves; e.g., controlled to dispose one or both of the bleed valves 104, 106 in a desired position: closed, open, or partially open. The controller 108 is in signal communication with the respective bleed valves 104, 106. The controller 108 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. The controller 108 includes or is in communication with one or more memory devices. The present disclosure is not limited to any particular type of memory device, and the memory device may store instructions and/or data in a non-transitory manner. Examples of memory devices that may be used include a computer readable storage medium, a read-only memory, random access memory, volatile memory, non-volatile memory, static memory, dynamic memory, flash memory, cache memory, and/or any device that stores digital information.

Referring to FIG. 3, in the operation of a present disclosure configured turbine engine 22, air is drawn into the turbine engine 22 via the nacelle inlet cavity 74 and subsequently drawn into the fan section 32. The airflow exiting the fan section 32 either passes into the bypass duct 82 or enters the core gas path 50 via the compressor inlet 84. Airflow exiting the bypass duct 82 produces propulsive force at certain engine power settings.

Entrained particulate matter can be particularly problematic in those sections of the engine 22 where component cooling is required; e.g., in the combustor section 36, the turbine section 38, and the like. In many applications, engine cooling schemes use relatively small diameter cooling apertures to produce impingement cooling and/or to establish cooling air boundary layer flow adjacent to a component surface, or the like. In these instances, the diameter of the cooling aperture may be directly related to the desired cooling effect. In some instances, the diameter of the cooling aperture is limited by the potential for particulate fouling; i.e., a minimum diameter of a cooling aperture is selected to avoid fouling and a consequent cooling deficit.

The present disclosure provides a novel and unobvious system and method for removing entrained particles upstream of the engine components where particulate fouling is problematic. In the present disclosure embodiment shown in FIG. 3, airflow enters the core gas path 50 via the compressor inlet 84 and passes through the LPC 42. The pressurized air subsequently enters the first axial segment 86 of the turning duct assembly 68. As indicated herein, some present disclosure embodiments may include a first actuatable bleed valve 104 downstream of and proximate to the FAS inlet 86A of the first axial segment 86. If the first actuatable bleed valve 104 is disposed in an open configuration (i.e., either fully or partially open), a portion of the pressurized air (which may include entrained particulate matter) will pass through the first actuatable bleed valve 104 and enter the bypass duct 82, wherein it passes outside of the core gas path 50. Within the present disclosure system, the controller 108 may be configured with stored instructions to actuate the first actuatable bleed valve 104 to an open configuration during certain flight mission segments (having a greater propensity of particulate ingestion) and to a closed configuration during other flight mission segments (having a lesser propensity of particulate ingestion). The remaining portion of the pressurized air travels axially within the first axial segment 86, substantially in an aft axial direction. The pressurized air subsequently enters the first return segment 90 that substantially reverses the direction of the air; i.e., from a substantially aft axial direction to a substantially forward axial direction. The term "axial" is used herein with respect to the turning duct assembly 68 to refer to a line that is parallel to the engine axial centerline 28. The term "substantially axially" is used herein with respect to the turning duct assembly 68 to refer to a direction that generally parallel to the engine axial centerline 28, but may deviate slightly in a radial direction; e.g., the FAS inlet 86A of the first axial segment 86 may be at a different radial position relative to the engine axial centerline 28 than the FAS exit end 86B of the first axial segment 86 but the magnitude of the radial component variation is minor relative to the axial length of the respective axial segment.

The present disclosure leverages the inertia of the entrained particles entering the first return segment 90 to remove (i.e., "purge") the entrained particles from the pressurized airflow. The inertia of the particles (which is a function of the mass of the respective particles) resists the change in airflow direction that occurs within the first return segment 90. The inertia causes the entrained particles to travel towards the outer wall 94 of the first return segment 90, and thereby concentrate within a portion of the airflow proximate the outer wall 94 of the first return segment 90.

In those embodiments that include a second actuatable bleed valve 106, the aforesaid bleed valve 106 is in communication with the outer wall 94 of the first return segment 90; e.g., at or before the outer radial inflection point of the first return segment 90. The bleed valve 106 is positioned and configured to permit entry of air and the concentration of particles therein to enter the bleed valve 106. The air and the entrained particles passing through the bleed valve 106 are removed from the core gas path 50. In some embodiments, there may be a difference in static pressure across the second actuatable bleed valve 106; i.e., the pressure at the inlet of the bleed valve 106 is greater than the pressure at the exit of the bleed valve 106. Hence, the position of the bleed valve 106 relative to the first return segment outer wall 94, the inertia of the particles creating the concentration of particles at the outer wall 94, and the difference in pressure across the bleed valve 106 collectively facilitate the removal of particulate matter. As indicated herein, the second actuatable bleed valve 106 may be in communication with the controller 108 and may be actuated between a closed configuration and open configurations in a manner that reflects the need to remove entrained particulate matter; e.g., during certain segments of a "flight mission" such as initial idling, taxiing, takeoff, landing, return taxiing, and the like.

In those embodiments that include a set of vanes (i.e., a "first set of flow vanes 96") disposed within the first return segment 90, the flow vanes 96 are configured to assist directing the pressurized air within the first return segment 90.

Depending upon certain operational factors (e.g., the degree to which the second actuatable bleed valve is open/closed, the concentration of particles entrained within the pressurized air, and the like), some amount of entrained particles may not be removed by the second actuatable bleed valve 106. In those embodiments that include a power turbine 100, the inlets to the power turbine 100 (e.g., passages 102/hollow struts) may be disposed in communication with the outer wall 94 of the first return segment 90, downstream of the second actuatable bleed valve 106. As can be seen diagrammatically in FIG. 3, the passages 102 are disposed to engage with the portion of the airflow proximate the outer wall 94 of the first return segment 90 understood to have a greater concentration of any entrained particulate matter that may be present elsewhere within the airflow.

The airflow entering the passages 102 (e.g., the hollow struts) enters the power turbine 100 in a generally radial direction (or in a direction that includes a radial component and a circumferential component) and is turned within the power turbine 100, exiting the turbine exit port 105 in a generally axial direction and passing into the nozzle 40. As the pressurized air passes through the power turbine 100 it drives the power turbine impeller. The power turbine impeller, in turn, is directly or indirectly in communication with the low pressure shaft 52 adding motive force to the low pressure shaft 52. A pressure difference between the inlet of the power turbine 100 and the nozzle 40 region at the turbine exit port 105 facilitates airflow from the first return segment 90 to the nozzle 40. The entrained particulate matter entering the power turbine passages 102 passes through the power turbine 100 and into nozzle 40 and thereby avoids passing through the remainder of the core gas path 50 that includes the HPC 44, the combustor, the HPT, and the LPT 48.

The portion of the pressurized air that does not enter the second actuatable bleed valve 106 or the passages 102 to the power turbine 100 travels axially forward within the second axial segment 88 of the turning duct assembly 68. As shown diagrammatically in FIG. 3, the second return segment 91 reverses (or almost reverses) the flow direction of the pressurized air within the turning duct assembly 68. As indicated above, in some embodiments the turning duct assembly 68 may include a second set of flow vanes 98 disposed within the second return segment 91 that are configured to assist directing the pressurized air within the second return segment 91 and aligning the direction of the pressurized air for entry into the HPC 44.

Pressurized air entering the HPC 44 is further worked to a higher pressure and temperature. Air exits the HPC 44 and enters the combustor section 36 where it is mixed with fuel and combusted. The combustion products and any non-combusted air subsequently travels through the HPT 46 and LPT 48 and exits the engine 22 via the nozzle 40.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A gas turbine engine having an axially extending centerline, the engine comprising:
   a fan section;
   a bypass duct;
   a compressor section having a compressor inlet, a low pressure compressor (LPC), and a high pressure compressor (HPC);
   a combustor section;
   a turbine section;
   a nozzle; and
   a turning duct assembly having a first axial segment, a second axial segment, a first return segment, and a second return segment;
   wherein the turning duct assembly defines a first portion of a core gas path that extends in order from the LPC to the first axial segment, from the first axial segment to the first return segment, from the first return segment to the second axial segment, from the second axial segment to the second return segment, and from the second return segment to the HPC; and
   wherein the first axial segment has an inlet end (FAS inlet end) in fluid communication with the LPC and an exit end (FAS exit end) in fluid communication with an inlet end of the first return segment (FRS inlet), and the second axial segment has an inlet end (SAS inlet end) in fluid communication with an exit end of the first return segment (FRS exit end), and an exit end (SAS exit end) in fluid communication with an inlet end of the second return segment (SRS inlet end), with an inlet of the HPC in fluid communication with an exit end of the second return segment (SRS exit end), and wherein the first axial segment and second axial segment extend substantially axially and the first return segment provides an arcuate passage from the FAS exit end to the SAS inlet end, and the second return segment provides an arcuate passage from the SAS exit end to an inlet of the HPC; and
   a first bleed valve in fluid communication with the first return segment.

2. The gas turbine engine of claim 1, further comprising a power turbine having an inlet in fluid communication with the first return segment.

3. The gas turbine engine of claim 2, wherein the first bleed valve is in fluid communication with an outer wall of the first return segment at a first position of the outer wall, and the power turbine is in fluid communication with the outer wall of the first return segment at a second position of the outer wall, and the second position is downstream of the first position.

4. The gas turbine engine of claim 2, wherein the turbine section includes a high pressure turbine and a low pressure turbine, and the engine further includes a low pressure shaft connecting the low pressure turbine to the LPC and the power turbine is in driving communication with the low pressure shaft.

5. The gas turbine engine of claim 2, wherein the power turbine is a radial inlet turbine.

6. The gas turbine engine of claim 1, further comprising a second bleed valve in fluid communication with the bypass duct; and
   wherein the first bleed valve is in fluid communication with the nozzle.

7. The gas turbine engine of claim 6, wherein the first bleed valve is actuable between a closed configuration and an open configuration and the second bleed valve is actuable between a closed configuration and an open configuration.

8. The gas turbine engine of claim 6, further comprising an annular flow splitter having a splitter inlet and a splitter outlet, wherein the splitter inlet is disposed to receive a portion of a core gas exiting the turbine section, and the splitter outlet is disposed radially outward of the annular exhaust flow splitter.

9. The gas turbine engine of claim 1, further comprising a first set of flow vanes disposed within the first return segment, the first set of flow vanes configured to direct an airflow within the first return segment.

10. The gas turbine engine of claim 1, further comprising a second set of flow vanes disposed within the second return segment, the second set of flow vanes configured to direct an airflow within the second return segment.

11. The gas turbine engine of claim 1, wherein a portion of the first axial segment, a portion of the second axial segment, and the first return segment are disposed radially outside of the HPC, the combustor section, and the turbine section.

12. The gas turbine engine of claim 1, wherein the first axial segment is configured to direct an airflow in a first axial direction, and the second axial segment is configured to direct the airflow in a second axial direction, wherein the first axial direction is substantially opposite the second axial direction.

13. The gas turbine engine of claim 12, wherein the first return segment is configured to turn the airflow about one hundred and eighty degrees and the second return segment is configured to turn the airflow about one hundred and eighty degrees.

14. The gas turbine engine of claim 1, further comprising a second bleed valve in fluid communication with the first axial segment, the second bleed valve is controllable to bleed a first portion of an airflow passing through the first axial segment into the bypass duct; and
 wherein the first bleed valve is in fluid communication with a nozzle such that a second portion of the airflow bled from the first axial segment is directed to the nozzle.

15. A gas turbine engine having an axially extending centerline, the engine comprising:
 a fan section;
 a bypass duct;
 a compressor section having a compressor inlet, a low pressure compressor (LPC), and a high pressure compressor (HPC);
 a combustor section;
 a turbine section;
 a nozzle;
 a turning duct assembly having a first axial segment, a second axial segment, a first return segment, and a second return segment, wherein the first axial segment has an inlet end (FAS inlet end) in fluid communication with the LPC and an exit end (FAS exit end) in fluid communication with an inlet end of the first return segment (FRS inlet), and the second axial segment has an inlet end (SAS inlet end) in fluid communication with an exit end of the first return segment (FRS exit end), and an exit end (SAS exit end) in fluid communication with an inlet end of the second return segment (SRS inlet end), with an inlet of the HPC in fluid communication with an exit end of the second return segment (SRS exit end), and wherein the first axial segment and second axial segment extend substantially axially and the first return segment provides an arcuate passage from the FAS exit end to the SAS inlet end, and the second return segment provides an arcuate passage from the SAS exit end to an inlet of the HPC and wherein the first axial segment, the second axial segment, the first return segment, and the second return segment are configured to provide an airflow passage from the LPC to the HPC;
 a first bleed valve in fluid communication with the first return segment;
 a power turbine having an inlet in fluid communication with the first return segment; and
 a plurality of struts, each having an internal passage in fluid communication with the first return segment and the inlet of the power turbine.

16. A method of removing particles entrained within an airflow passing within a core gas path of a gas turbine engine, wherein the gas turbine engine has an axially extending centerline, a compressor section having a compressor inlet, a low pressure compressor (LPC), and a high pressure compressor (HPC), a combustor section, a turbine section, and a nozzle, and the core gas path extends through the LPC, the HPC, the combustor section, and the turbine section, the method comprising:
 passing an airflow exiting the LPC through a turning duct assembly having a first axial segment, a second axial segment, a first return segment, and a second return segment;
 wherein the turning duct assembly defines a first portion of the core gas path that extends in order from the LPC to the first axial segment, from the first axial segment to the first return segment, from the first return segment to the second axial segment, from the second axial segment to the second return segment, and from the second return segment to the HPC; and
 wherein the first axial segment is configured to direct the airflow in a first axial direction, and the second axial segment is configured to direct the airflow in a second axial direction, wherein the first axial direction is substantially opposite the second axial direction, and the first return segment is configured to turn the airflow from the first axial direction to the second axial direction, and the second return segment is configured to turn the airflow from the second axial direction to the first axial direction;
 wherein the first return segment has an outer wall; and
 selectively bleeding a first portion of the airflow off of the outer wall of the first return segment using a bleed valve.

17. The method of claim 16, wherein the bleed valve is in fluid communication with the nozzle.

18. The method of claim 16, further comprising bleeding a second portion of the airflow off of the outer wall of the first return segment and directing the second portion of the airflow to a power turbine in driving communication with a low pressure shaft of the gas turbine engine.

* * * * *